INVENTOR
GEORGE A. McBRIDE
by Robyn Wilcox Atty.

Patented Aug. 6, 1946

2,405,315

UNITED STATES PATENT OFFICE 2,405,315

PURIFICATION OF SUGAR JUICE

George A. McBride, Barrington, Ill., assignor to Infilco Incorporated, Chicago, Ill., a corporation of Delaware Application July 1, 1942, Serial No. 449,360

8 Claims. (Cl. 127—48)

This invention relates to a process for the purification and clarification of sugar juice.

One important aspect of my invention is an improved process for continuously and simultaneously purifying and clarifying sugar juice.

Another object of my invention is an improved process for liming and clarifying raw sugar juice.

Another object of my invention is the rapid and complete purification and clarification of raw sugar juice in which the juice is heated and then limed and clarified in a single apparatus and as a single process, and whereby the impurities are removed as an easily filterable precipitate.

Another important object of my invention is to provide a sugar purification process wherein the formation of "scum" is prevented.

These and other objects of the invention will be apparent from the specification and claims which follow.

Heretofore it has been customary, in the purification of raw sugar juice, to add lime or similar precipitating reagents to the juice to form a precipitate which removes a large portion of the impurities therein, to heat the juice, either before or after "liming," to pass the heated and limed juice into a clarifier, ordinarily of the tray settler type, wherein the precipitate formed by the heating and liming is settled from the juice. The precipitate so formed has been light and delicate, and therefore does not readily settle from the juice. I have found that by carrying out the treatment with a precipitation reagent in accordance with my present invention the solids formed, while smaller in volume, are much denser than heretofore known, separate quite readily from the juice, and the precipitate so formed is readily filterable. I have also found that by carrying out the treatment of sugar juice in accordance with my process clarification is remarkably complete as well as remarkably rapid. I have found it possible to clarify sugar juice at rates up to 1½ to 2 gallons per square foot per minute as against the ordinary rate of ¼ to ½ gallon per square foot per minute. It is well known in the sugar treating art that the precipitate formed in the preliminary treatment contains a considerable quantity of sugar so that it is necessary for economical operation to filter the "mud." The solids, or "mud" formed in the practice of my invention is quite dense, and so contains less sugar juice, and it filters rapidly and easily. Thus my invention contemplates not only an improvement in the separation of the solid precipitate from the juice, but also an improved filterability of the precipitate.

Another important feature of my invention lies in the fact that by the treatment in accordance with my invention the formation of scum is eliminated. One of the usual disadvantages of the prior art treatment of sugar juice is the formation of scum which when it is formed in or carried into the clarifier upsets the economical operation thereof. Such scum in many instances had to be separately treated to extract sugar therefrom and to dispose of the waste therein. By my process, I am able to eliminate entirely the formation of scum. This is a feature of considerable importance as it not only permits a simpler apparatus, less cost for labor, but also avoids the troublesome disposition of such scum and prevents the waste of the sugar that is contained therein.

Apparatus suitable for carrying out the process referred to above may vary considerably in dimensions and in the proportion of its various parts, although certain essential features should be retained as will be pointed out in detail hereafter. For purposes of illustration, I will show a preferred embodiment of such apparatus although it will be obvious that various other forms could be used.

Figure 1:
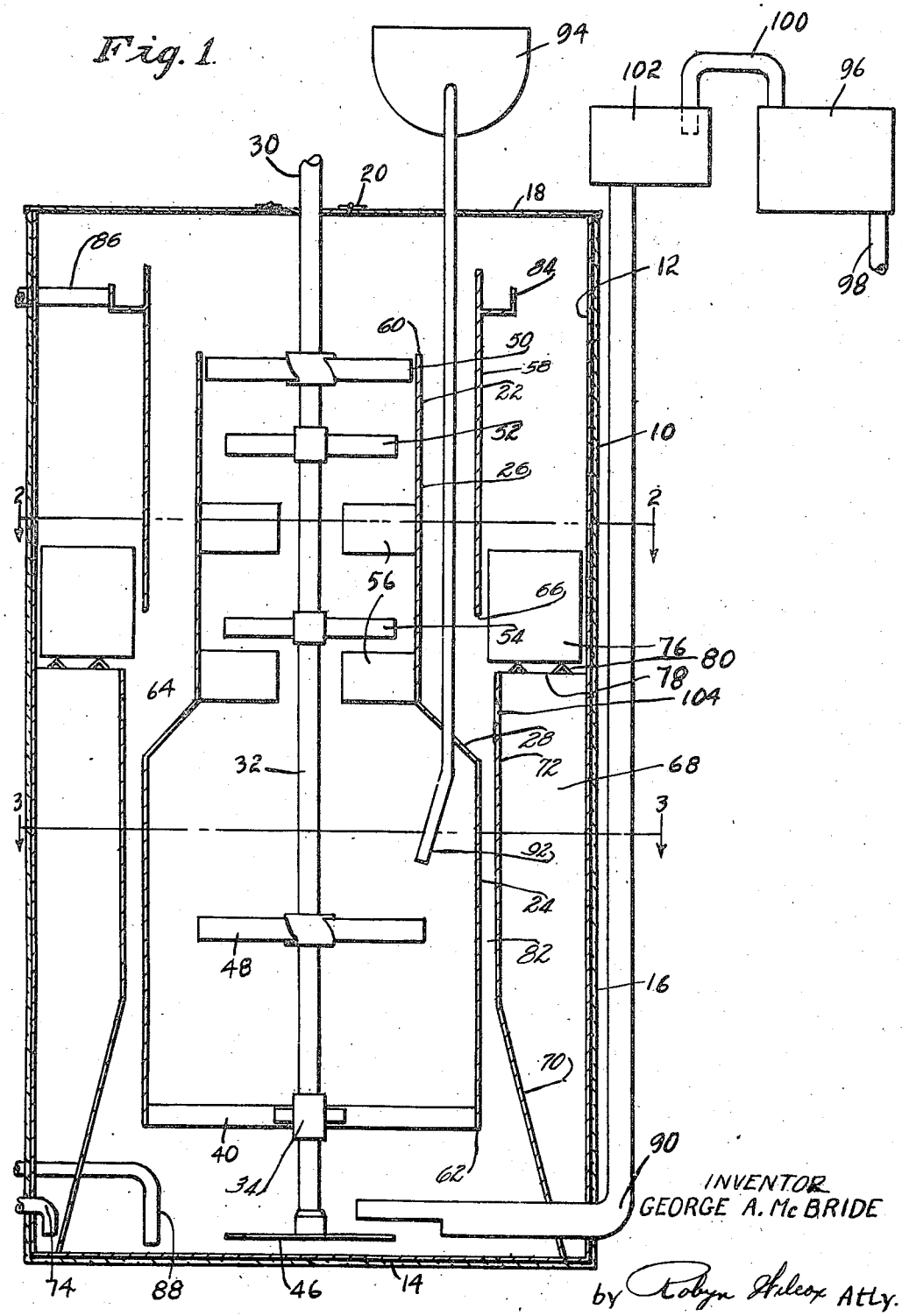
Figure 1 is a vertical cross-sectional view of a preferred embodiment of an apparatus suitable for the practice of my invention.
Figure 2:
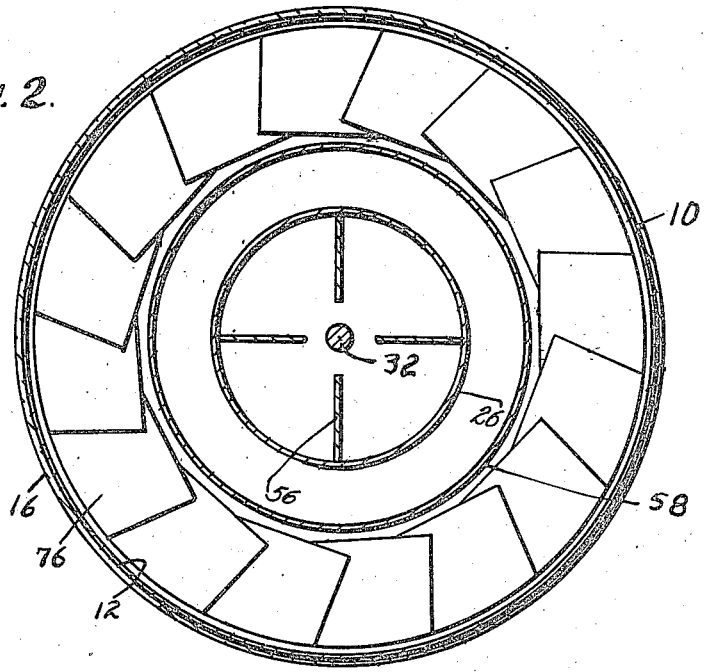
Figure 2 is a partial plan view of the apparatus shown in Figure 1 taken at the plane designated by the line 2—2 in Figure 1.
Figure 3:
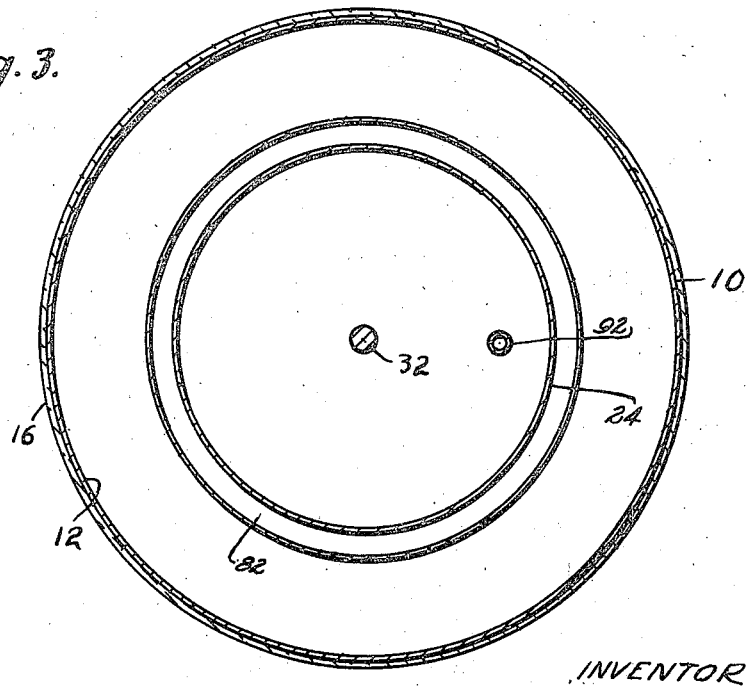
Figure 3 is another partial plan view of the apparatus shown in Figure 1 taken at the plane designated by the line 3—3 in Figure 1.

The preferred apparatus comprises a tank 10, which may be of any suitable size and shape but in the drawings is shown as a cylindrical tank with a vertical wall 12 and bottom 14. In view of the fact that the treatment of my invention contemplates the treatment of a heated juice and the maintenance of a predetermined temperature throughout the juice undergoing treatment, it is very desirable that the tank be insulated with any suitable insulating material, such as insulation 16. It is also desirable that the tank be provided with a cover 18, which should also be insulated. Preferably the cover may be hinged, as at 20, in order to permit ready access to the interior of the tank.

I provide a mixing and reaction zone 22 within the tank 10 and preferably coaxially aligned therein. The mixing and reaction chamber 22 may be constructed of any suitable material, such as sheet metal, and preferably is cylindrical in shape. In the embodiment shown, the lower portion 24 of the wall of the mixing and reaction chamber 22 is of larger diameter than the upper portion 26, and the two are connected by a sloping wall 28. The smaller upper portion of the mixing and reaction chamber terminates at a plane, as at 60, below the liquid level in the tank 10 and the lower end of the enlarged lower portion of the mixing chamber terminates at a level, as at 62, in spaced relationship to the bottom of the tank.

I provide a circulating and mixing apparatus 30 coaxially aligned in the mixing chamber 22. This circulating and mixing apparatus comprises a rotatable shaft 32, driven by any suitable mechanical means, not shown. This shaft 32 is journaled in suitable bearings, such as 34, supported by any suitable means such as spider 40. Attached to the lower end of the shaft 32 I place a cutter bar 46 adjacent the floor 14 of the tank. This cutter bar prevents the deposit of solids, such as sand contained in the raw juice or heavy precipitate which may be formed in the treatment, on the floor, and also, in the event of a shut-down, assists in resuspending any deposited solids. I also provide propelling means rigidly secured to the shaft 32. I prefer to use two impellers or propellers; one, 48, in the lower enlarged section of the mixing and reaction chamber, enclosed by wall 24, and the other, 50, in the smaller upper portion, enclosed by wall 26. I may also provide a plurality of agitating bars or blades, such as 52 and 54, to turbulently mix the liquid within the mixing and reaction chamber 22. I prefer to place a plurality of radial baffles 56 in the upper portion of the mixing and reaction chamber 22, in order to still to some extent the rotational movement of the liquid in the mixing and reaction chamber, which rotational movement unless so controlled may become quite extensive and undesirable in the treatment.

Surrounding the upper wall portion 26 of the mixing and reaction chamber 22 I place a draft tube 58, which may be of approximately the same diameter as the enlarged lower wall portion 24 of the mixing and reaction chamber. The draft tube 58 extends from above the liquid level in the tank downwardly towards the enlarged lower wall portion 24 of the mixing and reaction chamber.

It will be obvious that the arrangement above described provides a mixing zone, the lower end of which communicates with the bottom portion of the tank and which discharges into the draft tube 58 in the upper portion of the tank. The mixing and circulating apparatus 30 upon its operation provides for the rapid and turbulent flow of liquid through the mixing chamber from its lower end to its upper, where it discharges into the draft tube 58. The flow is then conducted downwardly to an intermediate level in the tank where it is discharged into the outer annular portion of the tank through the opening 64 between the lower end 66 of the draft tube 58 and the wall of the enlarged portion 24 of the mixing and reaction chamber.

In order to efficiently remove solids which are precipitated by the treatment I provide a large solids collecting chamber 68, which preferably may extend entirely around the vertical wall 12 of the tank. A preferred embodiment of this solids concentrating chamber is formed by a steeply sloping wall 70 extending upwardly from the bottom 14 of the tank adjacent the outer wall 12, to a point adjacent to, but spaced from, the wall of the enlarged lower portion 24 of the mixing and reaction chamber. The wall of the solids concentrating chamber then extends vertically to a level intermediate the top and bottom of the outflow opening 64, between the draft tube 58 and the wall 24 of the mixing and reaction chamber 22. I provide a plurality of conduits 74 communicating with the lower portion of the solids collecting chamber 68, to periodically remove solids collecting therein. In view of the fact that the solids formed in this treatment are quite voluminous, and compact quite extensively, it is desired that a plurality of such outlets 74 be provided and that each be provided with a flow regulating valve, not shown. I also prefer to provide a plurality of steeply sloping solids collecting plates 76 above the upper open end 78 of the solids collecting chamber, as shown. These may be supported by any suitable means, such as supports 80. The plates 76 may be placed partially within and partially above the upper open end 78 of the solids collecting chamber 68, if desired. The construction of the solids collecting chamber 68 above described provides an annular flow passage 82 between the solids collecting chamber 68 and the mixing and reaction chamber 22 for return of juice to the mixing zone. I may also provide a flow outlet 104 in the upper portion of the wall 72 of the solids concentrating chamber, to promote a flow of circulating juice around the solids collecting plates and in the upper part of the solids collecting chamber.

The tank 10 is also provided with an overflow launder 84 in the upper portion of the tank, which communicates with a clarified juice outlet 86. I also provide a drain 88 in the lower portion of the tank so that the tank may be drained upon the shut down of the apparatus, or for the periodical removal of heavy particles, such as sand contained in the raw juice or heavy granular precipitate, both of which may be too heavy to be carried by the circulation through the mixing and reaction chamber. Juice to be treated is introduced into the lower portion of the tank through a raw juice inlet conduit 90, which preferably introduces the raw juice adjacent the lower open end 62 of the mixing and reaction chamber 22. The precipitating reagent such as lime is introduced into the mixing and reaction chamber through chemical inlet pipe 92. I prefer, as shown in Figure 1, that the raw juice and the precipitating reagent be introduced at points removed from one another so that the first may be thoroughly mixed with circulating juice undergoing treatment before contact with the other. I have found that somewhat better results appear to be secured if the raw juice is introduced at the lower end of the mixing chamber and thoroughly mixed with the circulating slurry which is formed in the course of treatment by my process prior to the addition of the precipitating reagent. I prefer that the precipitating reagent be introduced in liquid form as that permits the more rapid and complete mixing of the reagent with the juice undergoing treatment and for this purpose I provide a chemical feeder such as lime slaker 94 for first mixing the chemical with water.

I prefer that the juice to be treated be first heated to a temperature of approximately 210 to 215° F. in order to provide for treatment at that temperature as I have found that better results are secured thereby. I therefore provide a raw juice heater 96, which may receive juice as it comes from the mill, not shown, through conduit or inlet 98. Such heaters are well known in the art and need not be described in detail. A conduit 100 carries heated juice to a flash and constant head box 102. The flash and constant head box 102 permits the escape of steam in the event the juice is overheated as I have found that such steam, if introduced into the mixing and reaction chamber 22, is apt to upset operating conditions. I have also found that it is very desirable to maintain a constant flow of heated juice into the reaction tank at all times.

In practicing the invention of my process, raw untreated juice flows from the mill through the conduit 98 into the heater 96, where it is heated to a predetermined temperature preferably of the order of about 214° F. From the heater the juice flows into the flash and constant head box 102, where any steam will be eliminated and which provides a constant flow of heated juice through the conduit 90 into the insulated reaction tank 10. The juice is introduced preferably at the lower end of the mixing and reaction chamber 22 and is there mixed with the slurry of juice undergoing treatment and unsedimented solids collected and accumulated from the large quantity of previously treated juice. The mixture is turbulently and rapidly passed upwardly through the mixing and reaction chamber 22, and in such passage the precipitating reagent, preferably in liquid form, is introduced thereto. The turbulent agitated flow of juice in the mixing and reaction zone provides for rapid and complete mixing of the precipitating reagent with the raw juice in the presence of the slurry so that reaction between the reagent and the juice takes place in and with the slurry. Such treatment permits the formation of a solid precipitate in the presence of previously formed solids and the newly formed precipitate tends to form on or to deposit upon the previously formed particles. The solid particles in the slurry therefore tend to grow by accretion to particles of rather large size. It has previously been taught in the art that such mixing should be done by gentle means as it was known that such particles were very delicate and therefore tended to disintegrate if the mixing were too turbulent. However, I have found that highly turbulent mixing and rapid circulation of the juice undergoing treatment, in contrast, tends to form particles much tougher and denser than any heretofore known in such treatment. The slurry passing through the mixing and reaction chamber 22 emerges into the draft tube 58 and then flows downwardly around the mixing and reaction chamber. The major portion of such slurry passes directly through the annular flow passage 82, between the mixing and reaction chamber 22 and the solids collecting chamber 68. A minor portion of the flow of slurry will pass horizontally out of the flow opening 64 at the lower end of the draft tube and pass between the sloping solids collecting plates 76. The larger particles formed by my treatment being very dense, rapidly deposit upon the solids collecting plates 76 and slide down into the solids collecting chamber 68. The juice undergoing treatment and the lighter particles from the slurry will return to the slurry flowing downwardly through the annular flow passage 82 and return with the major portion of the slurry to the lower end of the mixing and reaction zone 22. A minor portion of the juice undergoing treatment, corresponding to the heated juice introduced thereinto, will rise from the horizontal flow of slurry and emerge from the upper edges of the solids collecting plates completely clarified and will be withdrawn through the overflow 84 and the clarified juice outlet 86. Solids depositing upon the plates 76, or collecting in the solids collecting chamber 68, settle in the chamber and form a very dense and compact sludge which can be withdrawn from time to time through sludge outlet 74.

There will ordinarily be a sharp division or interface between the slurry in the lower portion of the tank and the clarified juice in the upper portion. This interface may be maintained at any desired elevation by controlling the withdrawal of solids from the concentrating chamber 68. Preferably I maintain the interface at approximately the upper edge of the opening 64 between the draft tube 58 and the mixing chamber. It may be maintained at a higher elevation if desired, and thus afford a greater amount of filtration of juice through the slurry. If so operated the upper portion of the slurry affords an effective filtering blanket which materially assists in the clarification of the juice. In this aspect of my invention the raw juice is heated, mixed with the slurry and with the precipitating reagent and after circulation for a period which permits completion of the chemical reactions between the juice and the reagent is percolated upwardly through the slurry at a rate which is sufficiently high to prevent settling of the slurry particles, but sufficiently low to permit the particles precipitated from the juice to be retained in said slurry.

I have found that by my treatment above described no scum or foam are formed in the juice. Just why such scum or foam is not formed is not understood, but actual commercial operation of my process and apparatus discloses that neither is formed in the reaction tank. Foam may occasionally be formed in the flash box 102, if the juice is heated above the boiling point and steam is thereby formed in the juice, but such foam even though permitted to flow into the reaction tank 10 disappears. I have also found by actual commercial operation that juice treated by my process and in my apparatus is much clearer than that treated in open defecators or other known clarifiers. In fact, actual commercial practice shows that the clarity of juice treated in my apparatus and by my process will be as much as 15% or more better than that of juice treated according to the prior art.

It has also been found by actual commercial operation that the color of the treated juice is whiter than that heretofore customary. This is believed to be due to the fact that the treating reagent such as lime is not added directly to the raw juice, which practice may result in the local burning of the juice. In my treatment the juice is first mixed with the slurry and is then very rapidly mixed with the treating reagent, so that local burning of the juice is prevented. I am, therefore, by my process able to secure a juice much clearer and much whiter than heretofore known. I have also found that by my process I am able to treat juice which is of such poor quality, such as juice from frozen cane, that it could not be economically treated by customary processes.

In connection with my invention I prefer that the heated juice be mixed with an amount of slurry equal to four or five times the volume of raw juice. This means that for every gallon of raw juice passed into the mixing and reaction zone, four or five, or more, gallons of slurry are recirculated therethrough. I also prefer that the slurry be relatively dense and that it contain solids up to the order of about forty per cent, by volume. It is preferred that the apparatus be so designed as to provide for the complete circulation of the contents of the mixing and reaction zone at least once within every four or five minutes. It is also very necessary that the temperature throughout the apparatus be maintained at a constant figure in order to avoid convection currents which will upset operation. It has been found that even opening the cover 18 for a matter of a few seconds will cause convection currents in the tank which would carry solids into the clarified juice in the upper portion of the tank and result in a turbid juice. I also prefer that the pH of the treated juice be maintained within a range of 6.5 to 7.0 although it has been found that a wider range can be used with satisfactory results.

Manifestly many modifications and variations of the invention herein described may be made by persons skilled in the art without departing from the spirit and scope thereof.

I claim:

1. A process for continuously clarifying sugar juice comprising the steps of maintaining a continuous stream of constant volume of said juice; heating said stream of juice to a temperature approaching the boiling point of said juice; introducing the stream of said juice into a confined mixing and reaction zone; continuously circulating a slurry containing juice undergoing treatment and unsedimented solids retained from previously treated juice in the mixing and reaction zone; rapidly mixing said juice and said slurry; continuously feeding lime into said mixing and reaction zone at a point removed from the point of introduction of the heated juice and mixing the same with said mixture of juice and slurry; circulating the resulting mixture of juice and solids from said mixing zone, through a less turbulent return flow zone and back into said mixing zone at a velocity sufficient to prevent sedimentation of solids from the circulating mixture; displacing clarified juice from said circulating juice in said return flow zone by entry of raw juice into said mixing zone; removing said clarified juice upwardly through a quiescent zone above said return flow zone; removing excess solids to waste from said return flow zone; and maintaining all of the juice throughout the process at a substantially uniform temperature approaching the boiling point of said juice.

2. In a process of clarifying sugar juice by the precipitation of impurities in solid particle form, the steps which comprise separately introducing a substantially constant flow of juice to be clarified heated to a temperature approaching the boiling point thereof and lime into a confined body of slurry comprising partially treated juice and a quantity of unsedimented solid particles collected from previously treated juice, the quantity of said particles being substantially in excess of the particles formed in the juice being treated, agitating the mixture of slurry, lime and juice in said confined body to produce precipitation of impurities in the presence of said solids and form additional slurry, passing slurry from the confined body into a lower portion of a vertically extending clarification zone, maintaining the liquid in said clarification zone in a sufficient state of quiescence to provide an upper limit for the rise of said solid particles therein, displacing clarified juice from the slurry in the lower portion of the clarification zone through such upper limit of solids therein into a superposed body of clarified juice in the upper portion of such clarification zone, withdrawing such clarified juice from the upper part of said body of clarified juice, returning slurry from the lower portion of the clarification zone into the confined body of slurry, and removing particles to waste from a level in said clarification zone adjacent the upper limit of said slurry.

3. A process for the clarification of raw sugar juice which comprises establishing a body of juice of substantially uniform temperature approximately the boiling point of said juice; dividing said body of juice into a body of slurry containing solid particles separated and collected from a relatively large volume of previously treated juice and a superposed body of clarified juice; subdividing the body of slurry into a confined mixing zone removed from said body of clarified juice and a relatively quiescent zone subjacent said body of clarified juice and in open communication therewith; imparting mechanical impelling energy to slurry in the mixing zone to provide an agitated mixing of the contents of such zone; introducing a constant flow of juice to be treated heated to approximately the boiling point thereof into said mixing zone; introducing lime into said mixing zone; passing slurry from such mixing zone into the quiescent zone; maintaining the liquid in said quiescent zone in a state of such quiescence as to provide an upper limit for the rise of solid particles therein; withdrawing vertically rising clarified juice through the said upper limit of solids in said quiescent zone into the superposed body of clarified juice; withdrawing clarified juice to use from the upper part of said body of clarified juice; returning a portion of the slurry from the lower portion of the quiescent zone into the mixing zone; and maintaining the volume and density of said body of juice containing solids substantially constant by withdrawing excess solids therefrom.

4. The process of claim 1 wherein the heated juice is mixed and circulated with at least approximately three times its own volume of slurry.

5. The process of claim 1 wherein the slurry contains up to 40% by volume solids.

6. In the purification and clarification of sugar juice the process which comprises the steps of retaining in the treating system a volume of already treated juice in excess of the amount of juice to be treated per minute and suspended solids accumulated from previously treated juice, maintaining said juice at a predetermined temperature approaching the boiling point of such juice, circulating such retained juice through a confined mixing zone of relative turbulence and a flow space of relative quiescence and back into said mixing zone, introducing juice heated to the predetermined temperature into the mixing zone at one point thereof, introducing an alkaline precipitating reagent into the mixing zone at another point thereof, said points being so spaced apart that the untreated juice will be mixed with the retained juice before contacting the precipitating reagent, continuously diverting from the circulating juice in the flow space into a superposed quiescent clarified juice zone a quantity of clarified juice equivalent to the amount of entering untreated juice, withdrawing such diverted juice to use from the clarified juice zone, and removing excess solids from said circulating juice.

7. In the clarification of sugar juice by a process which includes the precipitation of impurities therefrom, the process which comprises the steps of maintaining a body of juice undergoing treatment in a tank, maintaining said body of juice at a predetermined temperature approximating the boiling point of the juice, providing a confined mixing zone in the lower portion of the tank and a superposed quiescent zone in the upper part of the tank, and a flow space leading from one elevation of the mixing zone to another elevation therein and being also in open communication with the quiescent zone, retaining in the mixing zone and flow space a slurry containing juice undergoing treatment and a large quantity of solids separated and accumulated from previously treated juice and retaining in the quiescent zone a quantity of clarified and treated juice, separately introducing juice to be clarified heated to said predetermined temperature and an alkaline precipitating reagent into the slurry in the mixing zone, turbulently agitating the slurry in the mixing zone, circulating a large volume of slurry from the mixing zone through the flow space and back into the mixing zone, displacing clarified juice from the flow space into the lower portion of the quiescent zone, withdrawing clarified juice from the upper part of the quiescent zone, and withdrawing excess solids from the flow space.

8. In the precipitation of impurities from sugar juice the process which comprises heating a stream of juice to approximately the boiling point, passing the heated juice into a relatively large volume of juice undergoing treatment in a confined mixing zone and containing a large volume of solids retained in suspension from previously treated juice, adding lime to the mixture of newly entering juice and retained juice in the mixing zone, agitating the juice in the mixing zone sufficiently to provide a turbulent mixing of the contents thereof, continuously passing a quantity of the mixture formed in the mixing zone considerably in excess of the amount of heated juice entering to be treated into a semi-quiescent flow space, clarified juice rising upwardly from the mixture entering said flow space into a superposed quiescent zone, displacing clarified juice from the upper portion of the quiescent zone by entry of heated juice into the mixing zone, returning a major portion of the mixture entering said semi-quiescent flow space downwardly into a lower portion of the confined mixing zone for mixing with newly entering juice, withdrawing excess solids to waste from the semi-quiescent flow space, and maintaining the temperature of the juice undergoing treatment substantially constant at approximately the boiling point throughout the process.

GEORGE A. McBRIDE.